May 9, 1950     D. F. JONES     2,507,254
DOUGHNUT GUN
Filed March 25, 1946     2 Sheets-Sheet 1
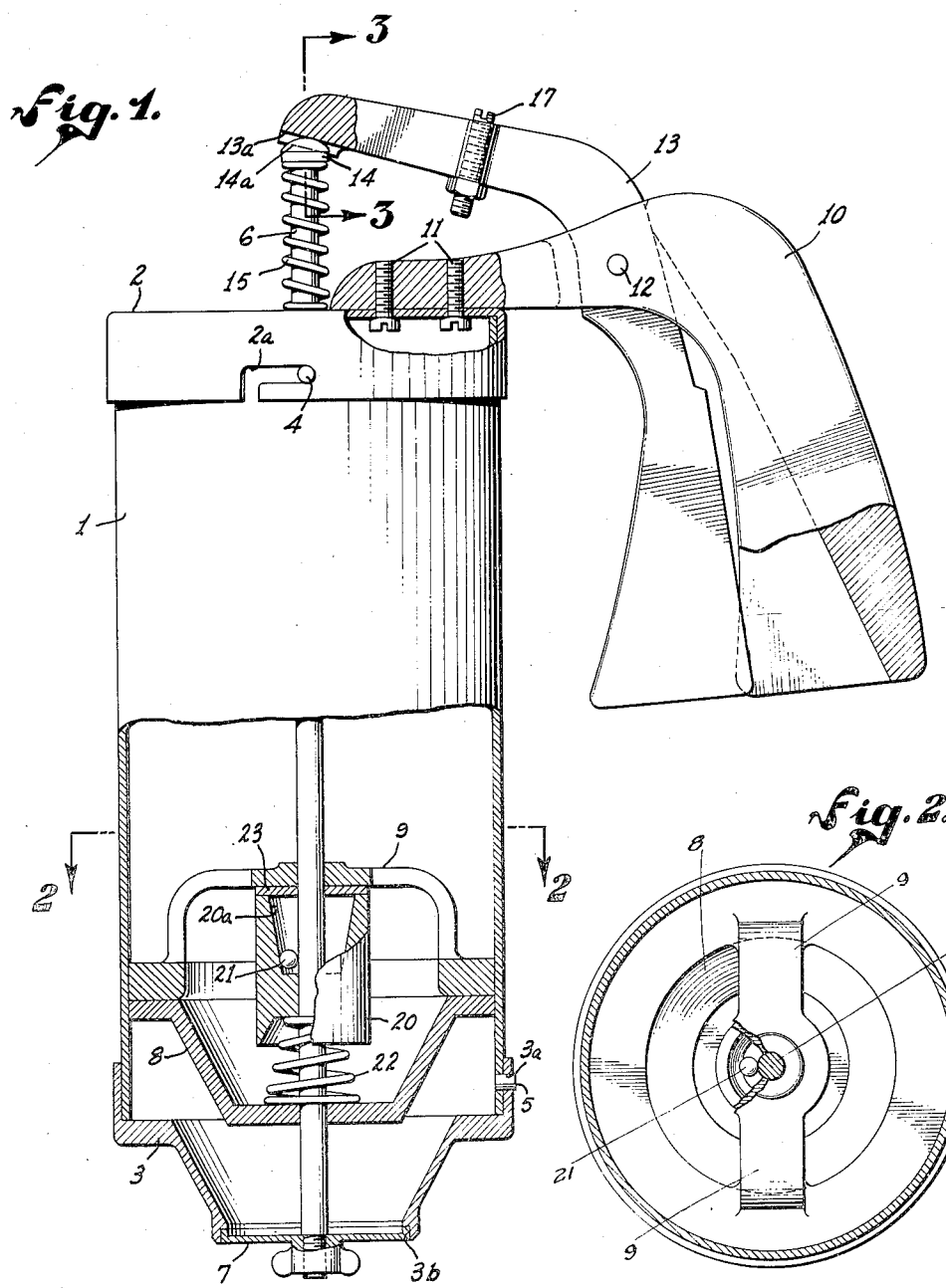
INVENTOR:
DAVID F. JONES.
BY 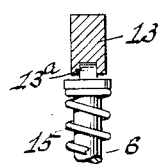
ATTORNEY.

May 9, 1950 D. F. JONES 2,507,254
DOUGHNUT GUN
Filed March 25, 1946 2 Sheets-Sheet 2
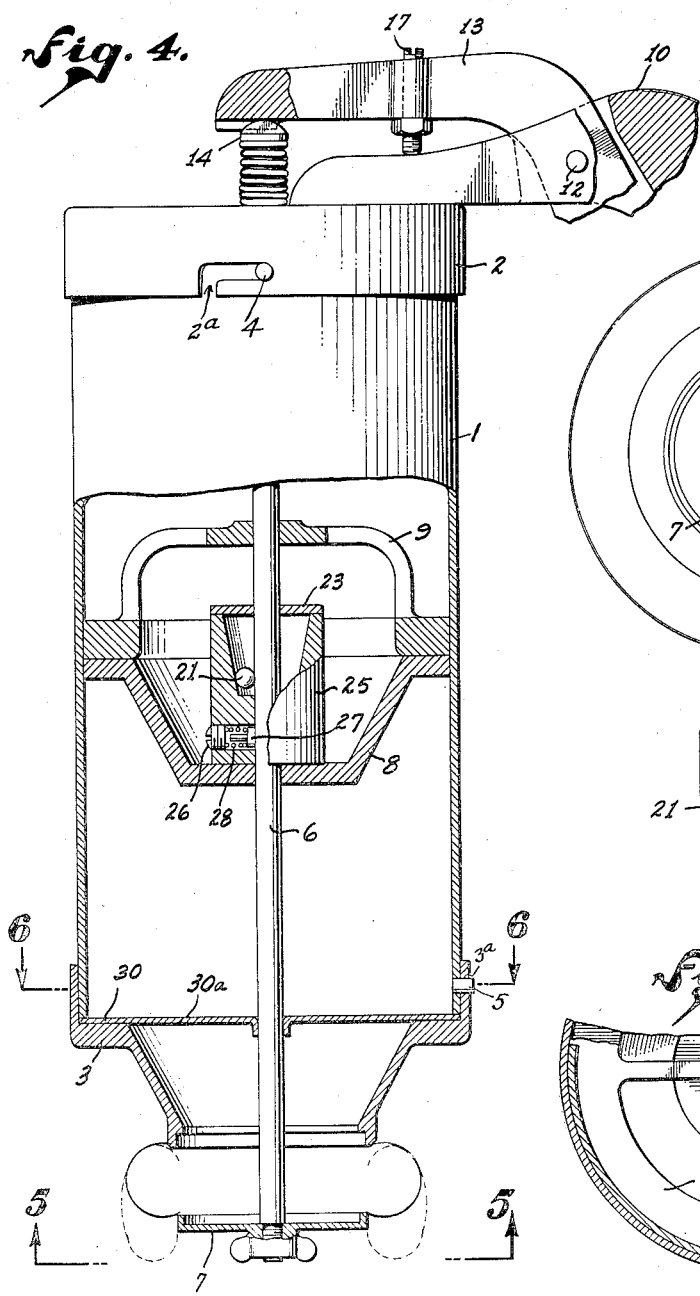
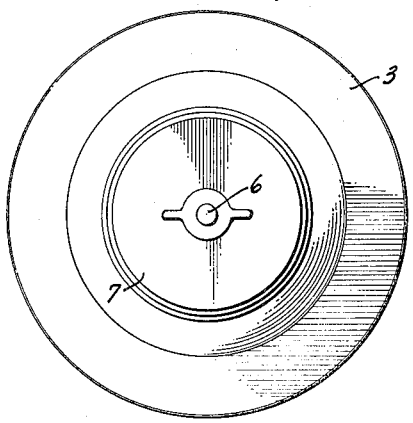
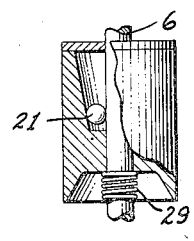
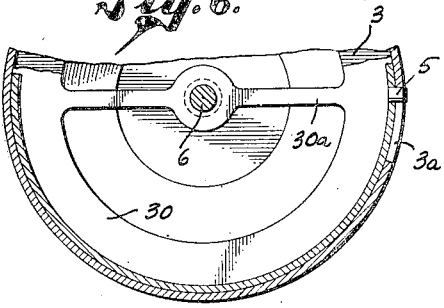
INVENTOR:
DAVID F. JONES.
BY
*TMartin*
ATTORNEY.

Patented May 9, 1950

2,507,254

UNITED STATES PATENT OFFICE 2,507,254

DOUGHNUT GUN

David F. Jones, Alhambra, Calif., assignor, by direct and mesne assignments, to Hom-Ade, Inc., a corporation of California Application March 25, 1946, Serial No. 656,864

6 Claims. (Cl. 107—14)

This invention relates to a device for making doughnuts and has particular reference to a hand operated device, or gun for use in the average household.

It is the general object of my invention to provide a simple and inexpensive doughnut gun which may be operated by any person familiar with kitchen duties quickly to form and deliver doughnuts of uniformly perfect size and shape.

Another object is to embody in my improved doughnut gun automatic means for correctly measuring the quantity of dough to be delivered at each operation of the gun.

These and other objects of the invention will be apparent from the following detailed description and by referring to the accompanying drawings, of which:

Fig. 1 is a side elevational view of a doughnut gun embodying the invention and with parts thereof broken away for the sake of clearness;

Fig. 2 is a cross-sectional view taken on line 2—2 of Fig. 1;

Fig. 3 is a detail view of the top portion of Fig. 1 as viewed in the direction of the arrow;

Fig. 4 shows the device as it appears at the time the batch of dough required to form the doughnut is fully expelled from the gun and with minor modifications embodied therein;

Fig. 5 is a bottom view of the gun;

Fig. 6 is a fragmentary view taken on line 6—6 of Fig. 4; and

Fig. 7 is a detail view showing a further modification of a portion of the metering devices of the invention.

The structure of the invention comprises a cylindrical shell 1 which is closed at the top by a cap 2 and at the bottom by a cap 3. Both caps are detachable and they are preferably held locked in position by projecting studs 4, 5 of the shells seated in similar L-shaped slots 2ª, 3ª of the caps. The upper cap 2 is centrally perforated to receive and guide a plunger rod 6 which is shown threaded at the bottom to receive a circular disc 7 which, in the position indicated in Fig. 1, is snugly seated within a central perforation 3ᵇ of the bottom cap 3.

A cup-shaped member 8, which for convenience may be termed the piston of the device is fitted to slide within the shell, on the rod 6, and it is noticed that the shape of the outer bottom surface of this piston corresponds to that of the inner top surface of the cap 3. The importance of this feature will become apparent as the description of the device progresses. A frame 9 rises from the piston and it is centrally perforated to ride on the rod 6.

A handle 10 is suitably fastened to the top surface of the cap 2, as by means of screws 11, and this handle is perforated to receive a pin 12, on which a lever 13 is pivotally hung. The outer end of this lever is shown grooved at 13ª to receive a flattened portion 14ª of a head 14, which is suitably fastened in position on the upper end of the rod 6. A coil spring 15 is placed on the rod between the upper surface of the cap 2 and the head 14 for the purpose of maintaining the rod in the elevated position of Fig. 1 and the bottom of the cap 3 closed by the disc 7. For convenient operation the outer ends of the handle 10 and the lever 13 are shaped to form a pistol grip, by the operation of which the rod and the disc are forced downward, against the tension of the spring 15, into the position of Fig. 4.

As a preliminary to using the device, it is required first to fill the shell with dough. In order to do this, it is necessary to turn the device upside down, then to unscrew the disc 7 and to detach the cap 3. In turning the device upside down, it is found that the piston 8 sinks to the bottom, leaving the shell open for reception of the dough. When shell is completely filled, the cap 3 and disc 7 are reseated, and the device returned to the position of Fig. 1.

As above stated it is an important feature of the invention that the amount of dough expelled from the gun at each operation is so exactly measured that it will remain in position between the disc 7 and the lower rim of the cap 3, substantially as indicated in Fig. 4. If more dough than required is expelled, it will settle about the disc as shown in dotted outline and more or less completely break away from the gun. But even if it does not break away, it is found that it will close up in cooking and so will not form a perfect product. But, when the parts of the device are properly proportioned and the stroke of the rod and disc 7 correctly calculated, it is found that a perfect doughnut will be produced. I have found that this result may be best attained in the type of gun herein described in the following manner.

The piston 8 is free to slide on the rod and so is not directly affected by the movement of the rod. For this reason it is necessary to introduce a propelling member for the piston, and this member takes the form of a cylindrical sleeve 20 which is fitted to ride on the rod 6. The upper end of the perforation thereof is shown cone-shaped to form an annular chamber 20ª therein and one or more balls 21 are seated in this chamber. A spring 22 urges the sleeve upward, but the ball checks such movement and, because the ball checks upward movement of the sleeve, it is seen that downward movement of the rod, in response to gripping action by the operator's hand, positively forces the sleeve downward. This movement is not, however, immediately transmitted to the piston, but the latter remains stationary until the sleeve compresses the spring and comes into contact with the piston, which thereupon is positively forced downward to expel the dough from the gun. It should be clear to anyone competent to design a device as herein described that the distance covered by the sleeve before contacting the piston holds a certain fixed relation to relative diameters of the shell and the disc 7; and that the proportions thereof must be correctly calculated in order to insure successful operation of the gun. If found advantageous in this connection, it is possible to adjust the stroke of the rod, and this may be done by placing a stop screw 17 in the lever 13 for contact with the handle 19.

In view of the foregoing description, it is seen that the piston is advanced step by step, each time the grip on the handle is tightened, until it reaches the cap 3; and it is important to note that the disc 7 cleanly and sharply cuts off an annular mass of dough of the correct size and shape each time the rod is returned by the spring 15. The gun may now again be turned upside down and opened for refilling. In doing this, it is seen that the ball 21 will drop within the sleeve 20 and so will permit the sleeve and piston again to sink within the shell. A plate 23 should be placed on the open end of the sleeve to maintain the ball within the chamber 20ª. It is also seen that the guide frame 9 serves to limit the movement of the sleeve away from the piston in order that the desired relations of the sleeve to the piston may always be maintained.

The tension of the spring 22 should be sufficient to overcome the weight of the sleeve and the ball or balls 21 therein, in order to make certain that the sleeve is held elevated against the frame 9 during the return movement of the rod 6. While such spring has been found quite satisfactory for this purpose, it may be preferred to maintain the sleeve in position by other means such, for example, as shown in Fig. 4. In this case, the sleeve 25 remains unchanged, except that a hole is sunk radially through the wall of the sleeve and this hole is threaded to receive a screw 26. A plunger 27 is seated in this hole and it is by a spring 28 held pressed against the rod 6. The friction against the rod in this manner developed is sufficient to cause the sleeve to cling to the rod and so to rise therewith on the return stroke thereof.

A simpler way of accomplishing this result is, in Fig. 7, shown to consist in placing a short spring 29 so tightly about the rod 6, that it will cause the sleeve to rise with the rod on the return stroke thereof. As shown in Figs. 4 and 6, a spider like frame 30 may be placed at the bottom of the shell 1 to guide the lower end of the rod and so to make certain that the disc 7 retains its axial alignment with the opening 3ᵇ during the return movement of the rod 6 and the disc. It is, however, necessary to place this guide frame a distance away from the opening 3ᵇ in order to afford the discharging dough time to flow together after being cut by the arms 30ª of the guide frame.

I claim:

1. In a doughnut gun, a cylindrical casing, a coaxial stem slidable through said casing and terminating at the bottom in a cap, means yieldingly maintaining said stem and cap elevated to close the bottom of the casing, manual means for depressing the stem to open the bottom of the casing, a piston slidable within the casing, a sleeve on the stem within said piston having a limited axial movement relative to the piston, means urging said sleeve into its uppermost position within said piston, means locking said sleeve for downward movement with the stem thereby to depress said piston, the stem being free to rise within the sleeve at the end of each piston depressing movement, and means on said manual means for adjusting the depressing movement of the stem.

2. In a doughnut gun, a cylindrical casing, a coaxial stem slidable within the casing, a cap mountable on said stem to close the bottom of the casing, manual means for depressing the stem to open the casing, a piston slidable on the stem within the casing, a sleeve on the stem within said piston and axially movable relative to the piston, means locking said sleeve for downward movement with the stem thereby to depress said piston, the stem being free to rise within the sleeve at the end of each piston depressing movement, and means for resiliently urging rising axial movement of the sleeve within said piston.

3. In a doughnut gun, a cylindrical casing, a stem co-axially slidable within the casing, a cap mountable on the end of said stem to close the bottom of the casing, means yieldingly maintaining said stem and cap elevated, manual means engaging the opposite end of the stem for depressing the stem and cap to open the casing, means for adjusting the depressing movement of the stem, a piston within the casing slidable on the stem, a sleeve on the stem within said piston having freedom of limited axial movement within the piston, and means within said sleeve for locking the sleeve for downward movement with the stem upon depression thereof until the end of said limited movement is reached, continued downward movement of the sleeve causing depression of the piston, the stem being free to rise within the sleeve at the end of each piston depressing movement.

4. In a doughnut gun having a cylindrical casing, a stem axially slidable within the casing, a cap on one end of said stem, means maintaining the stem and cap yieldingly elevated to close the bottom of the casing, a piston within the casing slidable on the stem, a sleeve on the stem having freedom of limited sliding movement within said piston, means urging said sleeve into its uppermost position within said piston, and means within the sleeve locking the sleeve for downward movement with the stem to move the sleeve within the piston to the end of said limited movement and thereupon to depress the piston, the stem being free to rise within the sleeve at the end of each piston depressing movement.

5. In a doughnut gun, a cylindrical casing, a coaxial stem, an annular cone-shaped flange at the bottom of the casing, a circular disc mountable on the end of the stem, means urging the stem upward to bring said disc into engagement with the lower end of said flange thereby to close the bottom of the casing, a piston slidable within the casing, the lower end of said piston being conically shaped to fit the internal surface of said flange, a sleeve on the stem within said piston and having freedom of limited axial movement within the piston, and means for locking said sleeve for downward movement with the stem thereby to depress the piston, the stem being free to rise within the sleeve at the end of each piston depressing movement.

6. In a doughnut gun, a cylindrical casing, a coaxial stem, an annular cone-shaped flange detachably secured to the bottom of the casing, a circular disc mountable on the end of the stem, means urging the stem upward to bring said disc into engagement with the lower end of said flange thereby to close the bottom of the casing, a piston slidable within the casing, the lower end of said piston being conical to fit the internal surface of said flange, a sleeve on the stem within said piston and having freedom of limited axial movement within the piston, means for locking said sleeve for downward movement with the stem thereby to depress the piston, the stem being free to rise within the sleeve at the end of each piston depressing movement, and means yieldingly maintaining the sleeve in set position on the stem until positively moved thereon, as aforesaid.

DAVID F. JONES.

REFERENCES CITED

The following references are of record in the file of this patent:

UNITED STATES PATENTS

| Number | Name | Date |
| --- | --- | --- |
| 613,457 | Miller | Nov. 1, 1898 |
| 1,101,552 | Hume | June 30, 1914 |
| 1,397,510 | Grassi | Nov. 22, 1921 |
| 1,790,763 | Pence | Feb. 3, 1931 |
| 1,963,430 | Zarafu | June 19, 1934 |
| 2,175,543 | Valle | Oct. 10, 1939 |
| 2,292,661 | Rush | Aug. 11, 1942 |
| 2,356,403 | Heidman | Aug. 22, 1944 |
| 2,416,470 | Cottingham | Feb. 25, 1947 |